United States Patent [19]

Berkey

[11] Patent Number: 4,750,926

[45] Date of Patent: Jun. 14, 1988

[54] METHOD OF MAKING PRECISION SHAPED APERTURES IN GLASS

[75] Inventor: George E. Berkey, Pine City, N.Y.

[73] Assignee: Corning Glass Works, Corning, N.Y.

[21] Appl. No.: 82,679

[22] Filed: Aug. 7, 1987

[51] Int. Cl.$^4$ .......................................... C03B 37/022
[52] U.S. Cl. ............................................ 65/2; 65/23;
65/268; 428/397
[58] Field of Search ................ 65/2, 3.11, 3.12, 23,
65/374.15, 268, 61, 108; 428/36, 397

[56] References Cited

U.S. PATENT DOCUMENTS

| | | | |
|---|---|---|---|
| 3,457,054 | 7/1969 | Pel | 65/23 X |
| 3,826,560 | 7/1974 | Schultz | 65/3.12 X |
| 4,283,213 | 8/1981 | Akers et al. | 65/2 X |
| 4,505,729 | 3/1985 | Matsumura et al. | 65/3.11 |
| 4,518,407 | 5/1985 | Black et al. | 65/3.12 |
| 4,636,235 | 1/1987 | Glessner et al. | 65/3.12 |
| 4,698,084 | 10/1987 | Severijns et al. | 65/3.11 |

*Primary Examiner*—Robert L. Lindsay
*Attorney, Agent, or Firm*—Walter S. Zebrowski

[57] ABSTRACT

Method of producing precision shaped apertures in glass is shown. A hollow glass member defining a longitudinal aperture is provided. A carbon graphite member is shaped externally to a desired shape, disposed within the longitudinal aperture in the glass member, which member is thereafter collapsed about the graphite member taking its shape and size. The graphite member is removed leaving the glass member with a precision aperture therein.

11 Claims, 2 Drawing Sheets

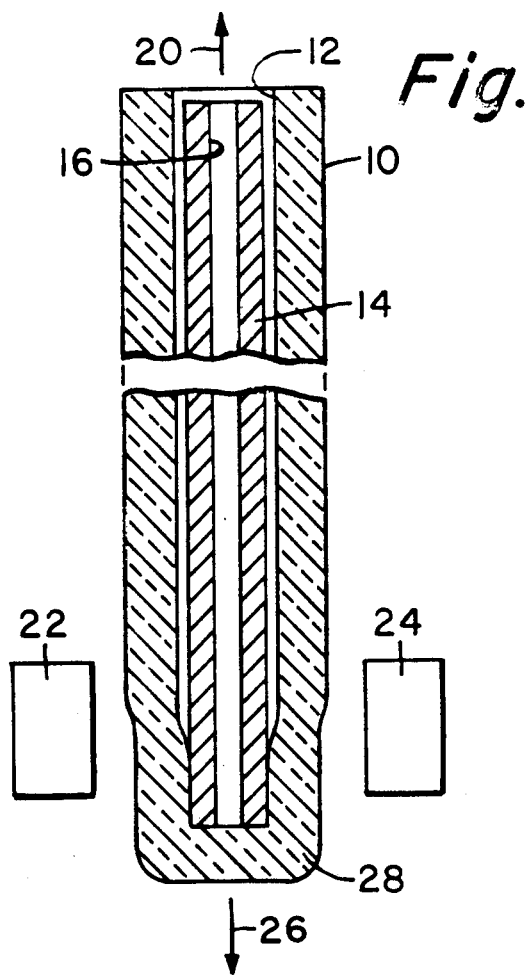
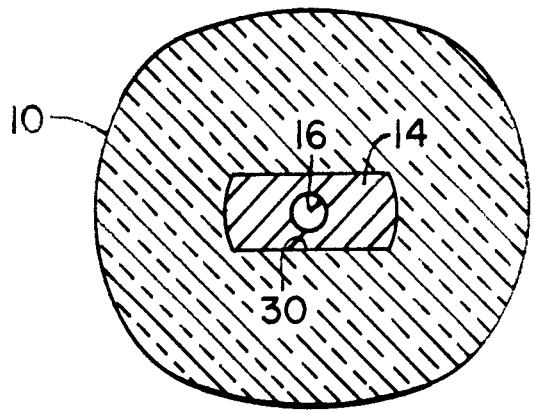
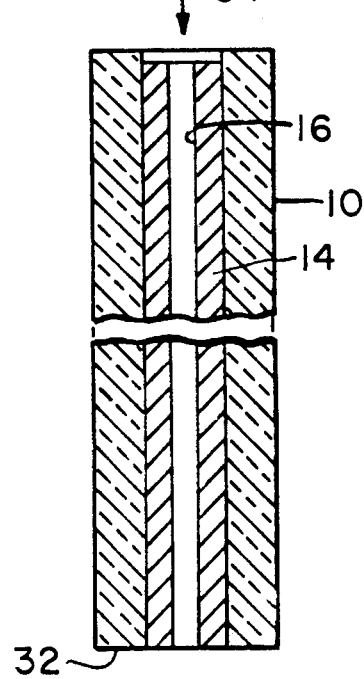
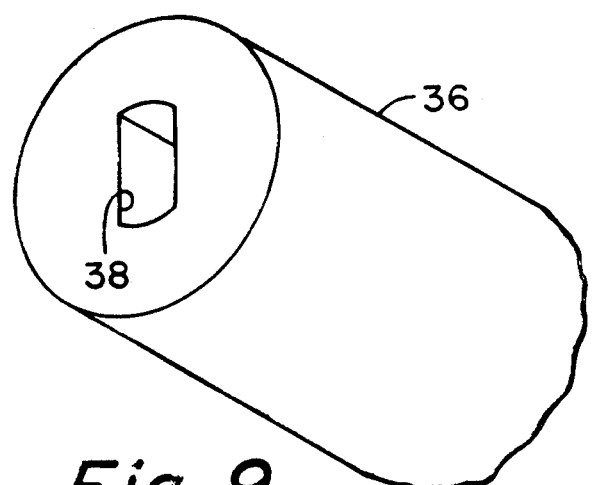
Fig. 6
Fig. 7
Fig. 8
Fig. 9

METHOD OF MAKING PRECISION SHAPED APERTURES IN GLASS

BACKGROUND OF THE INVENTION

The present invention relates to a method of making apertures of various shapes in glass, and more particularly to an economic method of making such shaped apertures or holes with precision as to shape and size; and to the resulting article.

In forming fiber couplers such as that described in my copending U.S. application Ser. No. 07/082,678 entitled "Method of Making An Economical Fiber Coupler" filed on even date herewith, it is found that the size and shape of the longitudinal aperture in the coupler member is critical for minimizing the excess losses in the coupler. As the longitudinal aperture in the coupler member approaches the shape and size of the fibers comprising the coupler, the excess coupling losses are decreased. It has been found that a large void spaces around the fibers allow macrobending losses to occur. In a situation where two fibers are coupled, the heretofore used round coupler member apertures proved to be less than the optimum shape for minimizing void space and the resulting losses. Another application of an article having precision shaped holes in glass in a non-pistoning capillary splice.

SUMMARY OF THE INVENTION

In view of the foregoing, it is an object of the present invention to provide an improved method of forming variously shaped apertures or holes in glass with precision as to shape and dimensions. In particular, it is an object of the present invention to provide an inexpensive method of reliably forming shaped apertures in glass which will overcome the heretofore noted disadvantages of the prior art.

Briefly, according the present invention, a hollow glass member having a substantially circular elongated aperture along its longitudinal axis is provided. In addition, a hollow longitudinal carbon member having a predetermined desired cross-sectional shape and size is similarly provided. The carbon member is disposed within the circular elongated aperture of the hollow glass member, and the aperture in the hollow glass member is sealed at one end thereof. The assembly so formed is heated to the softening point of the glass material while the longitudinal aperture in the glass member is placed under vacuum. As the glass is heated, it collapses around the carbon member such that the elongated interior aperture of the glass member assumes the shape of the exterior carbon member under the influence of heat and vacuum.

The sealed end of the hollow glass member is then cut-off so that the longitudinal aperture within the carbon member is open at both ends.

The carbon member is preferably graphite, as herein defined, and its cross-sectional shape may be substantially any desired shape. After the glass member is collapsed about the carbon member, an oxygen containing gas is flowed through the longitudinal aperture in the hollow carbon member while the assembly so formed is subjected to heat. In this manner, the carbon is oxidized and thereby removed from the interior of the glass member. Since the oxidation of carbon may take place at a temperature substantially less than the softening point of the glass, the interior shape and size of the aperture within the glass member remains in tact. Specifically, the size and shape of the aperture in a hollow glass member does not change as a result of the carbon removal. The resulting apertured glass member may be used as is or may be redrawn to decrease its size while maintaining its shape.

These and additional objects, features and advantages of the present invention will become apparent to those skilled in the art from the following detailed description and the accompanying drawing, which is incorporated in and constitutes part of the present specification, on which, by way of example, only the preferred embodiments of this invention are illustrated.

BRIEF DESCRIPTION OF THE DRAWING

FIG. 6 is a cross-sectional view illustrating the collapsing step of the present invention.

FIG. 7 is a cross-sectional view of the glass member collapsed around the carbon member in accordance with the present invention.

FIG. 8 is a cross-sectional illustration of the removal of said carbon member.

FIG. 9 is a partial oblique view illustrating the resulting article having a precision shaped aperture therein in accordance with the present invention.

DESCRIPTION OF THE PREFERRED EMBODIMENTS

It is to be noted that the drawings are illustrative and symbolic of the present invention and there is no intention to indicate scale or relative proportions of the elements shown therein.

Figure 1:
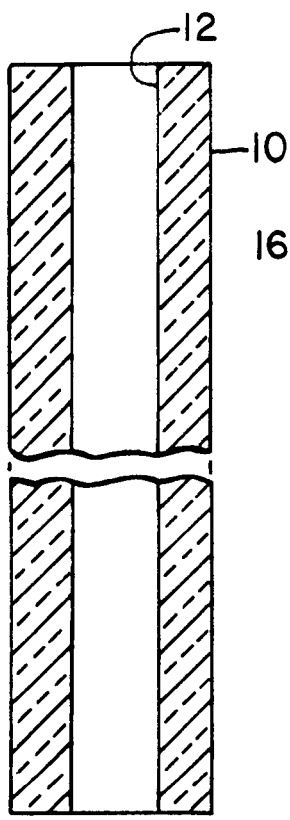
FIG. 1 is a cross-sectional elevation of a hollow glass member having a longitudinal aperture.
Figure 3E:
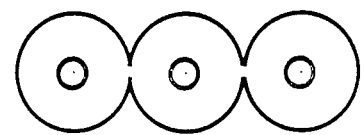
FIGS. 3a through 3e are cross-sectional illustrations of various shapes which are suitable for the carbon member of FIG. 2 in accordance with the present invention.

Referring to FIG. 1, there is provided a hollow glass cylindrical member 10 defining longitudinal aperture 12 therein. As will be understood, member 10 may be formed in any way known in the art. For a teaching of application of particulate material, consolidation, drawing, and generally forming a hollow glass member reference is hereby made to U.S. Pat. Nos. 3,659,915 to R. D. Maurer and P. C. Schultz, 3,711,262 to D. B. Keck and P. C. Schultz, 3,737,292 to D. B. Keck, P. C. Schultz, and F. Zimar, 3,737,293 to R. D. Maurer, 3,775,075 to D. B. Keck and R. D. Maurer, 3,806,570 to J. S. Flamenbaum, P. C. Schultz, and F. W. Voorhees, 3,859,073 to P. C. Schultz, 3,884,550 to R. D. Maurer and P. C. Schultz, 3,933,454 to R. D. DeLuca, 4,286,978 to A. C. Bailey and S. B. Miller, 4,289,517 to A. C. Bailey and S. B. Miller, and 4,310,339 to M. G. Blankenship, all of which patents are hereby expressly incorporated herein by reference.

Figure 2:
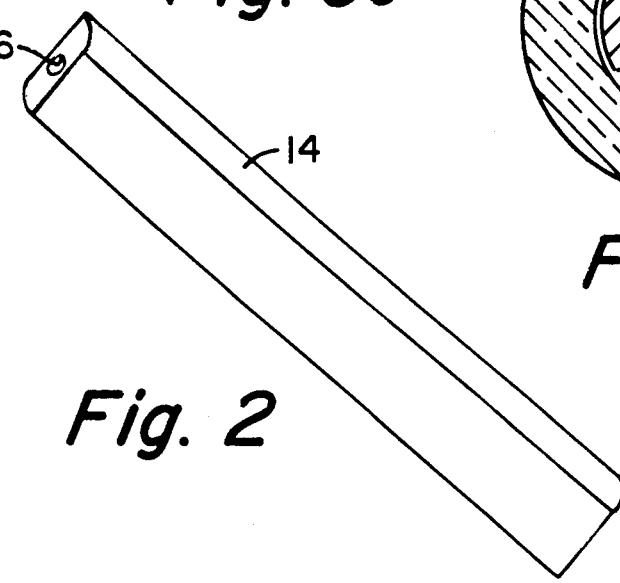
FIG. 2 is an oblique view of a hollow carbon member of the present invention.

Referring additionally to FIG. 2, there is shown a hollow longitudinal carbon member 14 defining a longitudinal aperture 16 therein.

Carbon member 14 is preferably formed of graphite and may be formed in any manner known in the art, however, a particularly suitable method is to start with a commercially available graphite rod of adequate size and removing so much of the exterior thereof so as to form the desired cross-sectional shape. Longitudinal aperture 16 is formed in carbon member 14 by drilling or the like so as to facilitate the subsequent removal of the carbon member as hereinafter described in detail.

Graphite or carbon graphite as used herein shall be defined as amorphous carbon generally known as black lead or plumbago, and which is commonly used for crucibles, electrodes, pencils and the like.

As is seen, longitudinal carbon member 14 is formed in a substantially rectangular cross-sectional shape. However, the shape of member 14 may be any shape which is suitable for the purposes intended. Reference is hereby made to FIGS. 3a through 3e illustrating various cross-sectional shapes into which carbon member 14 may be formed. Utility of some of these shapes will be described hereinafter. The various shapes illustrated and others are herein defined as complex shapes.

Figure 5:
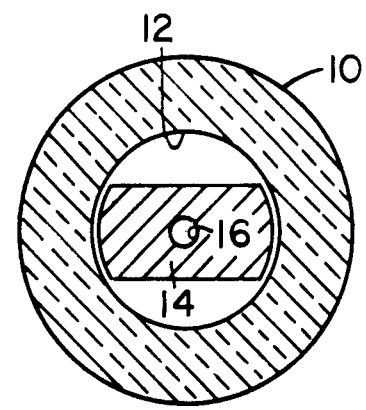
FIG. 5 is a cross-sectional view along lines 5—5 of FIG. 4.
Figure 4:
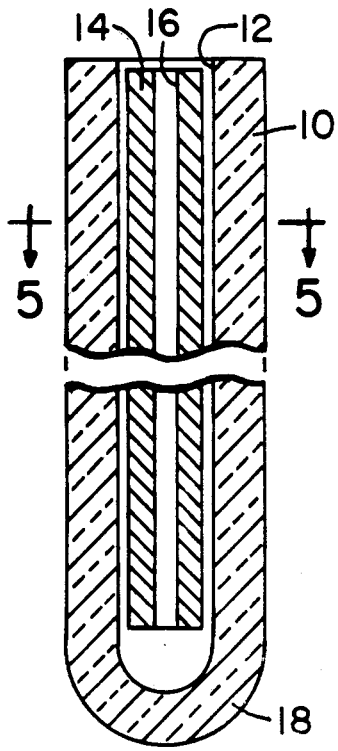
FIG. 4 is a cross-sectional view of a carbon member disposed within a hollow glass member in accordance with the present invention.

Referring to FIG. 4, there is illustrated the insertion of longitudinal carbon member 14 into the longitudinal aperture 12 of glass member 10. One end 18 of glass member 10 is sealed by fusion of the glass as illustrated. Referring additionally to FIG. 5, there is illustrated a cross-sectional view of the assembly of FIG. 4 along lines 5—5.

The assembly so formed is then connected to a source of vacuum, not shown but illustrated by arrow 20, in a manner well known in the art. The vacuum source is connected to the assembly at the end of glass member 10 opposite the sealed end thereof. In this manner, the interior of glass member 10 within aperture 12 is subjected to the vacuum as in the whole of carbon member 14.

The assembly is then heated by means of heaters 22 and 24 until the material of glass member 10 reaches the softening point thereof. Glass member 10 then collapses around carbon member 14 under the influence of the softened condition of glass member 10 and the vacuum inside thereof. The assembly is traversed through the heaters as shown by arrow 26. As the glass member collapses around carbon member 14, the internal surface of glass member 10 assumes the shape and dimensions of the exterior surface of the carbon member as illustrated by the collapsed portion 28 in FIG. 6. This is clearly illustrated in the cross-sectional view shown in FIG. 7 wherein the internal surface 30 of glass member 10 has been precisely conformed to the exterior surface of carbon member 14. As will be understood, even though glass member 10 has been heated to the softening point of the glass material thereof, the integrity of carbon member 14 remains for the reason that the whole of carbon member 14 is maintained in a vacuum during this portion of the processing.

Referring additionally to FIG. 8, there is shown glass member 10 wholly conformed to carbon member 14. After the assembly so formed is cooled, the sealed end thereof at surface 32 is removed. In this manner, the longitudinal aperture 16 of carbon member 14 is open at both ends of the assembly. A source of oxygen or oxygen containing gas is connected to the assembly so formed and flowed through the longitudinal aperture 16 as illustrated by arrow 34. The source of the oxygen or oxygen containing gas is not shown and its connection to the assembly is as well understood in the art. The assembly is then heated to a temperature less than the softening point of the glass of glass member 10 while the oxygen containing gas is flowed. In this manner, carbon member 14 will be caused to oxidize and will be removed as CO or $CO_2$, as will be understood. It is seen, that aperture 16 facilitates the removal of the carbon material. Without aperture 16, the removal of the carbon material would be excessively prolonged.

The source of heat for removing the carbon member is not shown but may be a suitable furnace, as is well understood in the art.

After the carbon is removed as hereinabove described, the resulting glass article 36 is shown in FIG. 9 with the remaining longitudinal aperture 38. Longitudinal aperture 38 will precisely correspond to the size and shape of carbon member 14 and would not change in size or shape during the removal of carbon member 14 since the removal takes place at temperatures below the softening point thereof.

Figure 3A:
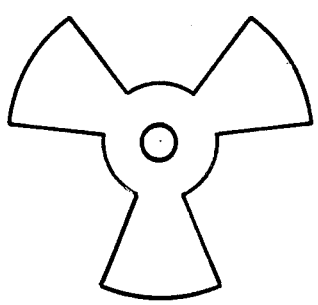
Figure 3B:
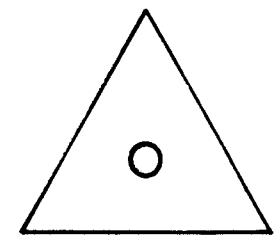
Figure 3C:
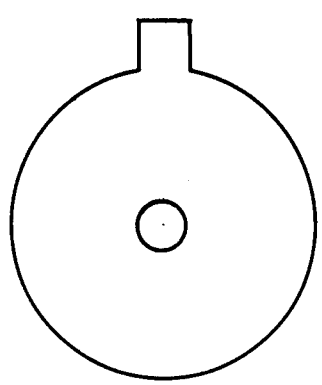
Figure 3D:
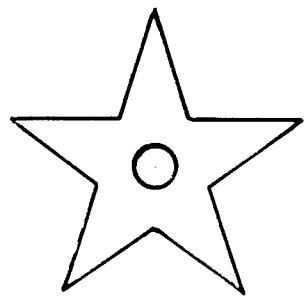

As will be understood, the complex shapes illustrated in FIGS. 3a through 3e are readily obtained by the process of the present invention through the influence of vacuum and heat as herein described. FIG. 3c may be suitable for forming a glass aperture for a piston, or the like, wherein a lubricant or other fluid is flowed thereto or therefrom through the notched area illustrated. An aperture having the shape of FIG. 3e may be suitable in the formation of a fiber coupler as described in my companion application Ser. No. 07/082,678.

A typical example of the present invention is as follows. A glass tube or boule may be formed as described in U.S. Pat. No. 4,310,339 to M. G. Blankenship. Any other suitable method for making a starting tubular glass member is also satisfactory for the purposes of the present invention. Specifically, a hollow glass tubular member having an inside diameter of 7 mm, an outside diameter of 40 mm and a length of 40 cm was provided. A carbon graphite rod having an outside diameter of 6.5 mm was then shaped to an approximate rectangular shape having dimensions of 2.8 mm by 6.5 mm by machining the sides of said graphite rod. Only two sides of the graphite rod were machined forming the longer sides of the rectangle while the remaining sides were unmachined, thus approximately rectangular. A center aperture was formed in the graphite rod by drilling with a 2 mm diameter hole with a gun drill.

The shaped graphite rod was then inserted into the tubular glass member and one end of the glass member was sealed by fusion. For the purposes of this example, tubular glass member was formed of 9 weight percent borosilicate glass. The end of the glass tube opposite the sealed end, was connected to a source of vacuum and the assembly was lowered into a carbon resistance Astro furnace at a rate of about 10 mm/minute. The leading edge of the assembly was the sealed end. As the assembly was heated to a temperature of approximately 1500° C. the glass member collapsed around the rectangular carbon rod under the influence of the heat and the vacuum taking the shape of the exterior of the carbon rod. The vacuum in the center of the glass member facilitated collapsing the glass and keeping the carbon from oxidizing.

The glass member did not elongate as it passed through the furnace because the carbon rod provided reinforcing therefor.

After the entire glass member collapsed about the carbon rod, the resulting assembly was cooled and the sealed end was cut off by means of a diamond saw in a manner well known in the art resulting in a continuous hole through the assembly. The assembly so formed was then lowered into a furnace maintained at 1250° C. at a rate of 1 mm/minute while oxygen was flowed through the center hole of the carbon member. The temperature of 1250° C. is below the softening point of the glass preventing elongation of the glass while the carbon readily oxidized as CO and $CO_2$ and was removed by venting from the furnace.

The resulting article was a glass member with a substantially rectangular aperture of precisely the same shape and size as the starting rectangular carbon rod.

The article so formed may be redrawn into a capillary cane with a precise rectangular capillary hole if desired. As will be understood, a capillary tube with any other shaped hole may be similarly formed.

The present invention has been particularly shown and described with reference to the preferred embodiments thereof, however, it will be understood by those skilled in the art that various changes in the form and details may be made therein without departing from the true spirit and scope of the invention as defined by the following claims.

I claim:

1. A method of forming a shaped, hollow member comprising the steps of:
    providing a hollow glass member having a substantially circular elongated aperture along its longitudinal axis,
    providing a longitudinal carbon member having a predetermined desired cross-sectional shape,
    disposing said carbon member within said circular elongated aperture of said hollow glass member,
    heating the assembly so formed to the softening point of said glass member,
    placing the interior of said hollow glass member under vacuum,
    collapsing said glass member around said carbon member whereby the elongated interior aperture of said glass member assumes the shape of the exterior of said carbon member, and thereafter,
    removing said carbon member.

2. The method of claim 1 wherein said carbon is carbon graphite.

3. The method of claim 2 wherein said carbon member is hollow.

4. The method of claim 3 wherein said carbon member is removed by oxidation of said graphite.

5. The method of claim 4 further comprising the step of flowing an oxygen containing gas through said hollow carbon member while removing said member.

6. The method of claim 1 further comprising the step of drawing said glass member to a predetermined desired size.

7. The method of claim 1 further comprising the steps of:
    providing a heating means, and
    traversing said assembly through said heating means whereby so that the glass member is collapsed onto said carbon member in a substantially continuous manner as said assembly is traversed through said heating means.

8. The method of claim 7 wherein the shape of the aperture remaining in said glass member after removal of said carbon member is substantially rectangular.

9. The method of claim 7 wherein the shape of the aperture remaining in said glass member after removal of said carbon member is substantially triangular.

10. The method of claim 7 wherein the shape of the aperture remaining in said glass member after removal of said carbon member is a complex shape.

11. The article made by the method of claim 1.

* * * * *